United States Patent
Heinze

(10) Patent No.: US 10,482,841 B2
(45) Date of Patent: Nov. 19, 2019

(54) OPERATOR CONTROL DEVICE FOR A MOTOR VEHICLE AND METHOD FOR OPERATING A MOTOR VEHICLE BY USING AN OPERATOR CONTROL DEVICE

(71) Applicant: AUDI AG, Ingolstadt (DE)

(72) Inventor: Martina Heinze, Eichstätt (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 16/319,068

(22) PCT Filed: Mar. 2, 2018

(86) PCT No.: PCT/EP2018/055126
§ 371 (c)(1),
(2) Date: Jan. 18, 2019

(87) PCT Pub. No.: WO2018/188849
PCT Pub. Date: Oct. 18, 2018

(65) Prior Publication Data
US 2019/0279593 A1  Sep. 12, 2019

(30) Foreign Application Priority Data

Apr. 13, 2017 (DE) .......................... 10 2017 206 414

(51) Int. Cl.
*G06F 3/041* (2006.01)
*G09G 5/00* (2006.01)
(Continued)

(52) U.S. Cl.
CPC ............. *G09G 5/003* (2013.01); *B60K 35/00* (2013.01); *B60W 50/08* (2013.01); *B60W 50/14* (2013.01);
(Continued)

(58) Field of Classification Search
CPC ............. B60K 35/00; B60K 2370/195; B60K 2370/152; B60K 2370/52;
(Continued)

(56) References Cited

U.S. PATENT DOCUMENTS

2010/0201147 A1* 8/2010 Jones .................. B60R 7/04
296/24.34
2011/0316807 A1* 12/2011 Corrion .............. G06F 3/0416
345/174
(Continued)

FOREIGN PATENT DOCUMENTS

DE           42 26 747 C1   12/1993
DE     10 2009 008 727 A1   11/2009
(Continued)

OTHER PUBLICATIONS

German Office Action dated Dec. 4, 2017 from German Patent Application No. 10 2017 206 414.5, 12 pages.
(Continued)

Primary Examiner — Christopher E Leiby
(74) Attorney, Agent, or Firm — Staas & Halsey LLP

(57) ABSTRACT

A touch-sensitive display device and a hand rest which can be adjusted between a first position and a second position are included in an operating device for a motor vehicle. The hand rest is arranged in the area of the display device. A control device activates a first display area of the display device and activates a manual driving mode of the motor vehicle when the hand rest is arranged in the first position. The control device activates a second display area of the display device and an autopilot of the motor vehicle when the hand rest is arranged in the second position.

20 Claims, 3 Drawing Sheets

(51) Int. Cl.
*B60K 35/00* (2006.01)
*B60W 50/08* (2012.01)
*B60W 50/14* (2012.01)
*G09G 5/14* (2006.01)

(52) U.S. Cl.
CPC ............ *G06F 3/0416* (2013.01); *G09G 5/14* (2013.01); *B60K 2370/1438* (2019.05); *B60K 2370/152* (2019.05); *B60K 2370/195* (2019.05); *B60K 2370/52* (2019.05); *B60W 2050/146* (2013.01); *G09G 2354/00* (2013.01); *G09G 2380/10* (2013.01)

(58) Field of Classification Search
CPC .......... B60K 2370/1438; B60W 50/08; B60W 50/14; B60W 2050/146; G09G 5/003; G09G 5/14; G09G 2354/00; G09G 2380/10; G06F 3/0416
See application file for complete search history.

(56) References Cited

U.S. PATENT DOCUMENTS

| | | | | |
|---|---|---|---|---|
| 2014/0156133 A1* | 6/2014 | Cullinane | ............. | B60W 30/00 701/23 |
| 2015/0032322 A1* | 1/2015 | Wimmer | ............. | B60W 30/143 701/23 |
| 2016/0259365 A1* | 9/2016 | Wang | ....................... | G09F 21/04 |
| 2017/0291544 A1* | 10/2017 | Ishihara | ................. | B60K 35/00 |
| 2018/0186266 A1* | 7/2018 | Fitzpatrick | ............. | B60N 3/063 |
| 2018/0186306 A1* | 7/2018 | Fitzpatrick | .......... | B60R 13/0243 |
| 2018/0281689 A1* | 10/2018 | Cha | ........... | B60R 7/04 |
| 2018/0334106 A1* | 11/2018 | Beauregard | ............... | B60R 7/04 |

FOREIGN PATENT DOCUMENTS

| | | |
|---|---|---|
| DE | 10 2010 009 490 A1 | 9/2011 |
| DE | 10 2012 002 306 A1 | 8/2013 |
| DE | 10 2013 110 864 A1 | 4/2015 |
| DE | 10 2014 003 023 A1 | 9/2015 |
| DE | 10 2014 006 338 A1 | 11/2015 |
| DE | 10 2015 010 662 A1 | 3/2016 |
| DE | 10 2015 010 026 A1 | 2/2017 |
| DE | 10 2017 206 414.5 | 4/2017 |
| EP | 3 064 987 A2 | 9/2016 |
| JP | 2012-52977 | 3/2012 |
| WO | PCT/EP2018/055126 | 3/2018 |

OTHER PUBLICATIONS

International Search Report dated Jun. 15, 2018 from International Patent Application No. PCT/EP2018/055126, 5 pages.

* cited by examiner

OPERATOR CONTROL DEVICE FOR A MOTOR VEHICLE AND METHOD FOR OPERATING A MOTOR VEHICLE BY USING AN OPERATOR CONTROL DEVICE

CROSS REFERENCE TO RELATED APPLICATIONS

This application is a U.S. national stage of International Application No. PCT/EP2018/055126, filed on Mar. 2, 2018. The International Application claims the priority benefit of German Application No. 10 2017 206 414.5 filed on Apr. 13, 2017. Both the International Application and the German Application are incorporated by reference herein in their entirety.

BACKGROUND

Described herein is an operator control device for a motor vehicle and a method for operating a motor vehicle by using an operator control device.

Nowadays it is technically possible for an autopilot to drive a motor vehicle automatically. In this context both the longitudinal guidance and the transverse guidance of the motor vehicle are controlled fully automatically, with the result that a driver does not have to engage actively at all any more in the control of the motor vehicle. German Patent Application No. 10 2014 003 023 A1 describes, e.g., the use of an autopilot in a motor vehicle. In this context there is provision that a support means of the motor vehicle, in the form of a cup holder or a fold-out table can be adjusted into an extended position of use if an autopilot of the motor vehicle is activated. When the autopilot is deactivated, adjustment of the support means into the position of use is prevented. This method is predominantly concerned with preventing a movement radius of the driver from being unnecessarily restricted by the respective support means as long as the driver has to control the motor vehicle himself.

Moreover, it is also known to make available touch screens, that is to say touch-sensitive display apparatuses, for controlling different functions in the passenger compartment of the vehicle. In conjunction with the piloted driving, that is to say when the autopilot is active, it is possible for the driver to be able to assume a somewhat more comfortable sitting position, for example by virtue of a seat which is adjusted further back or else by virtue of a seat which is turned away from the steering wheel. German Patent Application No. 42 26 747 C1 describes a method in which a seat of a motor vehicle is moved into a position in which it is turned away from a steering wheel of the motor vehicle if an autopilot of the motor vehicle is activated. The important factor here is that the driver can assume a sitting position which is, under certain circumstances, more comfortable for him if he currently does not have to control the motor vehicle himself.

In this context it would be desirable for a touch-sensitive display apparatus which can be comfortably reached by the driver in the normal sitting position, that is to say when the autopilot is not active, still to be able to be satisfactorily operated by the driver even in a, for example, somewhat leaning back sitting position, which he assumes in the automatic driving mode of the motor vehicle. This could be brought about, for example, by using an adjustable central console insofar as the touch-sensitive display apparatus is attached to the central console. However, this would entail relatively high costs, since the entire electronic system which is installed in the central console would have to be carried along, for which purpose, inter alia, corresponding cable lengths would also have to be kept available. In addition, this would increase the weight of the entire central console.

Furthermore, it would also be desirable per se if the driver could be informed particularly easily and clearly as to whether the motor vehicle is currently being operated in an autopilot mode or in a manual driving mode. German Patent Application No. 10 2013 110 864 A1 describes a method in which an autopilot display is extended from a recess in a dashboard of a motor vehicle as soon as an autopilot of the motor vehicle has been activated. As soon as the autopilot has been deactivated again, the autopilot display is withdrawn into the dashboard again. The activation of the autopilot can be carried out by displacing away a steering wheel in the direction of the dashboard or by activating a specific key. In this case, the driver is therefore informed which driving mode the motor vehicle is currently being operated in by the extension and retraction of the autopilot display.

SUMMARY

An operator control device for a motor vehicle and a method for operating a motor vehicle by using the operator control device can make possible, for example, particularly good operator control of the motor vehicle both in the manual and in a fully automatic driving mode. For example, a driver of the motor vehicle can be easily and reliably informed as to whether the vehicle is currently being operated in a manual or fully automatic driving mode.

An operator control device for a motor vehicle and a method for operating a motor vehicle by using such an operator control device are described herein. Advantageous refinements with expedient and non-trivial developments of the operator control device and method are further described herein.

The operator control device for a motor vehicle includes a touch-sensitive display apparatus and a hand rest which can be adjusted between a first position and a second position and which is arranged in the region of the display apparatus. Furthermore, the operator control device includes a control apparatus which is configured to activate a first display region of the display apparatus and a manual driving mode of the motor vehicle if the hand rest is arranged in the first position. In addition, the control apparatus is configured to activate a second display region of the display apparatus and an autopilot of the motor vehicle if the hand rest is arranged in the second position.

The activation and deactivation of the autopilot can therefore be brought about with the operator control device by adjusting the hand rest. A driver of the motor vehicle simply has to adjust the hand rest only into the first position in order to operate the motor vehicle in the manual driving mode in which the driver himself has to control the motor vehicle. As soon as the hand rest is located in the first position, it is automatically entailed by this that the control device activates the first display region of the display apparatus. In the first position the adjustable hand rest is, for example, located closer to the first display region than in the second position. The activation of the first display region means that, on the one hand, various contents can be displayed in this display region, and, on the other hand, a user, for example the driver of the motor vehicle, can control various functions of the motor vehicle by touching the first display region.

As soon as the hand rest has been adjusted into the second position, the control device activates the second display region of the display apparatus and the autopilot of the motor vehicle. When the autopilot is activated, it performs both the longitudinal guidance and transverse guidance of the motor vehicle, with the result that the driver does not have to act anymore at all in a controlling fashion on the motor vehicle. The driver can, for example, adjust his seat somewhat backward or else move the backrest inclination into a somewhat more comfortable position, since he does not have to operate either the steering wheel or the pedals of the motor vehicle. The activation of the autopilot automatically entails that the control apparatus activates the second display region of the display apparatus. In the second position, the adjustable hand rest is, for example, arranged closer to the second display region than in the first position. By activating the second display region, the driver can also comfortably reach and operate the touch-sensitive display apparatus, for example in a somewhat leaning-back sitting position.

The hand rest can be designed, for example, so as to be capable of being displaced and/or pivoted in order to assume the two positions. For example, it is possible for the hand rest to be capable of being displaced in the longitudinal direction of the vehicle and/or pivoted about an axis which runs in the transverse direction of the vehicle. On the basis of the position of the hand rest the driver can therefore detect at any time which driving mode of the motor vehicle is currently activated. Moreover, the operator control of the touch-sensitive display apparatus is made possible in a convenient fashion at any time by the corresponding activation of the first display region and the second display region as a function of the position of the hand rest and therefore also as a function of the currently selected driving mode.

By using the operator control device, the so-called mode awareness, that is to say the awareness of the currently selected driving mode of the motor vehicle is improved by a physical change in the passenger compartment of the vehicle by the adjustable hand rest. Moreover, an operator control region which is made available by using the touch-sensitive display apparatus is extended and/or displaced toward the driver by the corresponding activation and deactivation of the respective display regions of the display apparatus as a function of the position of the hand rest and therefore as a function of the currently selected mode of the motor vehicle.

One advantageous embodiment provides that the hand rest is arranged further forward in the longitudinal direction of the vehicle in the first position than in the second position, wherein the first display region is arranged further forward in the longitudinal direction of the vehicle than the second display region. In addition it is also possible for the hand rest to be arranged further upward in the vertical direction of the vehicle in the first position than in the second position, wherein the first display region is arranged further upward in the vertical direction of the vehicle than the second display region. In the first position of the hand rest, a driver who has positioned his hand on the hand rest can particularly easily reach and operate the first display region. In the second position of the hand rest, the driver who has positioned his hand on the hand rest can particularly easily reach and operate the second display region. The ease with which the various display regions are reached therefore corresponds to the corresponding position of the hand rest, which makes the activation of the touch-sensitive display apparatus easily possible at any time.

A further advantageous embodiment provides that the control device is configured to extend the first display region around the second display region if the hand rest is arranged in the second position. Therefore, if the hand rest is adjusted into the second position, the previously active first display region continues to be kept active, wherein in addition the second display region is activated. If the hand rest is then adjusted back again from the second position into the first position, the second display region is deactivated again and the first display region continues to be kept active. In this embodiment, the first display region of the display apparatus therefore always remains activated independently of the position of the hand rest, wherein only the second display region is additionally switched on or switched off as a function of the position of the adjustable hand rest. In other words, the operator control region of the touch-sensitive display apparatus is extended with the second display region in the case of piloted driving, that is to say when the hand rest is arranged in the second position and the autopilot is activated. The total display area which is available at the touch-sensitive display apparatus and therefore also the available operator control area are therefore also increased in size during the fully piloted driving of the motor vehicle. Since the driver need not intervene into the motor vehicle in a controlling fashion when the autopilot is activated, additional further contents can also be displayed to him by using the touch-sensitive display apparatus, which contents are not displayed to him during the manual driving mode for safety reasons. Moreover, owing to the enlargement of the display and operator control area of the touch-sensitive display apparatus it is also possible, if appropriate, to offer further control functions which relate, for example, to comfort or infotainment functions of the motor vehicle, to which the driver should preferably not have access during manual driving for safety reasons.

According to an alternative advantageous embodiment, there is provision that the control apparatus is configured to deactivate the first display region if the hand rest is arranged in the second position. In this case, the display and operator control region of the touch-sensitive display apparatus is therefore displaced when there is a changeover from the manual to the autonomous driving mode of the motor vehicle. The first display region which is still active during the manual driving mode is deactivated and the second display region of the display apparatus is activated. If the hand rest is displaced again into the first position from the second position, in this case the second display region is deactivated again and the first display region activated. This can be appropriate, in particular, if the first position and the second position of the adjustable hand rest are arranged relatively far from one another. In this case, it can be sufficient to activate the second display region during the piloted driving, since when the driver has his hand positioned on the hand rest he can only reach the second display region comfortably. It is also possible to make available on the vehicle side or operator control device side a selection facility by which the driver can select whether he wishes to switch on in addition the second display region or to switch off the first display region and to activate the second display region during the piloted driving.

In a further advantageous refinement there is provision that respective webs which are arranged laterally on the hand rest and are mounted on the vehicle side around an axis which runs in the transverse direction of the vehicle, in particular on a central console of the motor vehicle. As a result, the hand rest can be mounted on the vehicle side in a particularly simple and cost-effective fashion. By virtue of the fact that the hand rest is kept pivotable on the vehicle side by using the webs, the hand rest can be adjusted quite simply between the first position and the second position.

A further advantageous embodiment provides that the hand rest is mounted on the web so as to be pivotable about a further axis which runs in the transverse direction of the vehicle. For example, a respective upper end of the webs can be fastened in a pivotable fashion laterally to the hand rest, wherein a respective lower end of the webs is mounted on the vehicle side in a pivotable fashion. As a result it is possible, for example, for a support area of the hand rest always to be oriented upward in an ergonomically favorable fashion independently of the position of the hand rest, with the result that a vehicle occupant can rest or position his hand comfortably on the support area of the hand rest at any time.

According to a further advantageous embodiment, there is provision that the hand rest can be adjusted from the first position into the second position and/or from the second position into the first position only by activating a release key which is provided on the hand rest. The release key can be arranged, for example, on an underside of the hand rest, with the result that when a hand is positioned on the hand rest the release key can quite easily be activated. The driver must therefore activate the locking key so that the movement of the adjustable hand rest from the first position into the second position and/or from the second position into the first position is at all enabled. This can prevent the driver from inadvertently adjusting the hand rest between the two positions and as a result unintentionally changing to and fro between the automatic driving mode and the manual driving mode of the motor vehicle.

In a further advantageous refinement there is provision that the display apparatus is arranged obliquely with respect to a plane extending from the longitudinal direction of the vehicle and transverse direction of the vehicle. When the respective display regions of the touch-sensitive display apparatus are activated and deactivated, a central point of the active region of the touch-sensitive display apparatus therefore migrates both upward and downward as well as forward and rearward in the passenger compartment of the vehicle. In this context there is, for example, provision that the adjusted movement of the hand rest between first position the second position corresponds accordingly to the shifting of the center points active region of the touch-sensitive display apparatus. In other words, the inclination of the touch-sensitive display apparatus is selected such that it is matched to the adjustment movement of the hand rest. As a result it is possible to ensure that in particular the driver of the motor vehicle can activate the touch-sensitive display apparatus comfortably at any time by correspondingly switching on and switching off the respective display regions both in the first position and in the second position of the adjustable hand rest.

The motor vehicle includes the operator control device or an advantageous embodiment of the operator control device.

In the method for operating a motor vehicle by using the operator control device or by using an advantageous embodiment of the operator control device, the first display region of the display apparatus and the manual driving mode of the motor vehicle are activated if the hand rest is arranged in the first position. The second display region of the display apparatus and the autopilot of the motor vehicle are activated if the hand rest is arranged in the second position. Advantageous refinements of the operator control device described herein are to be considered advantageous refinements of the method described herein, and vice versa, wherein the operator control device carries out the method.

Further advantages, features and details can be found in the following description example embodiments as well as with reference to the drawings. The features and combinations of features which are specified above in the description and the features and combinations of features which are shown below in the description of the drawings and/or in the drawings alone can be used not only in the indicated combination but also alone or else in other combinations without departing from the scope of the disclosure.

BRIEF DESCRIPTION OF THE DRAWINGS

These and other aspects and advantages will become more apparent and more readily appreciated from the following description of the example embodiments, taken in conjunction with the accompanying drawings of which.

DETAILED DESCRIPTION

Figure 1:
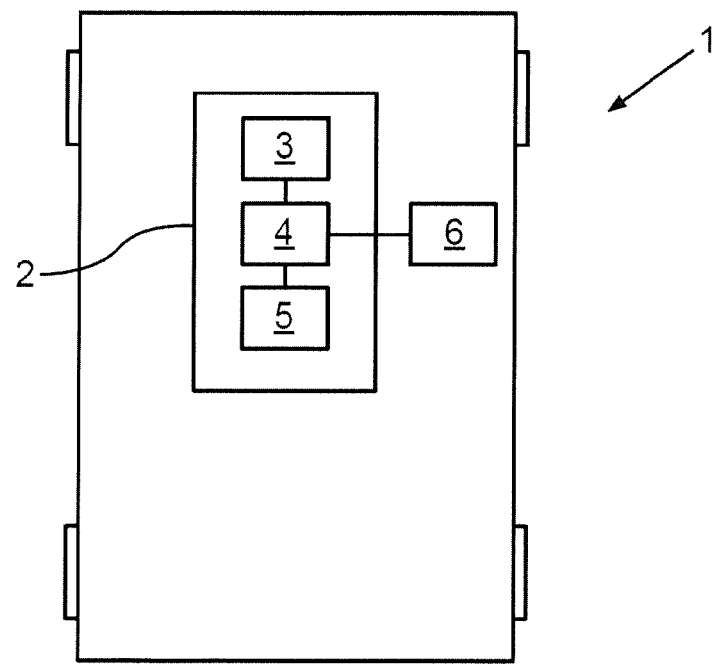
FIG. 1 is a schematic illustration of a motor vehicle with an operator control device which has a touch-sensitive display apparatus and a hand rest which can be adjusted between a first and a second position and which is arranged in the region of the display apparatus, wherein the operator control device has a control apparatus for controlling the display apparatus and for activating and deactivating an autopilot of the motor vehicle.

Reference will now be made in detail to the example embodiments which are illustrated in the accompanying drawings, wherein like reference numerals refer to like elements throughout.

A motor vehicle 1 having an operator control device 2 is shown a schematic illustration in FIG. 1. The operator control device 2 includes a touch-sensitive display apparatus 3, a control apparatus 4 and an adjustable hand rest 5 which is arranged in the region of the touch-sensitive display apparatus 3. In addition, a driver assistance system 6 is also indicated schematically, which driver assistance system 6 can make available an autopilot function for autonomously controlling the motor vehicle 1.

Figure 2:
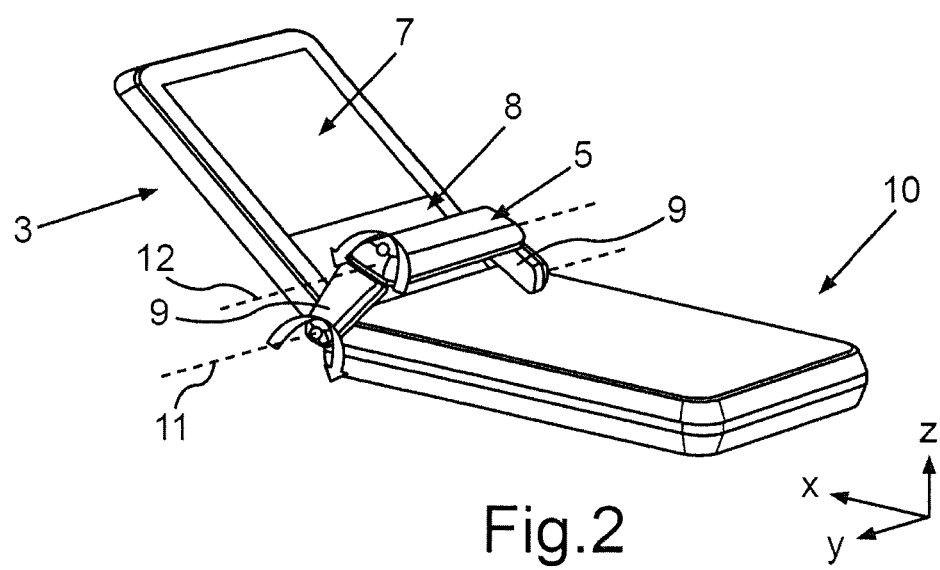
FIG. 2 is a perspective view in which the adjustable hand rest and the touch-sensitive display apparatus are illustrated.

In FIG. 2, the adjustable hand rest 5 and the touch-sensitive display apparatus 3 are shown in a perspective view. The hand rest 5 is arranged here in a first position which causes the control apparatus 4 to deactivate the driver assistance system 6, and as a result causes the motor vehicle 1 to be operated in a manual driving mode in which a driver of the motor vehicle 1 has to control the motor vehicle 1 completely manually.

As soon as the hand rest 5 is arranged in the first position shown here, the control apparatus 4 additionally causes a first display region 7 of the touch-sensitive display apparatus 3 to be activated. Furthermore, the touch-sensitive display apparatus 3 also has a second display region 8 which directly adjoins the first display region 7. The two display regions 7, 8 therefore together form the total available display and operator control area of the touch-sensitive display apparatus 3.

The hand rest 5 is pivotably mounted on a schematically indicated central console 10 of the motor vehicle 1 by using respective webs 9 which are laterally attached to the hand rest 5. Respective lower ends of the webs 9 are mounted on the central console 10 so as to be pivotable about an axis 11 which runs in the transverse direction y of the vehicle. The hand rest 5 itself is in turn mounted in an articulated fashion at respective upper ends of the webs 9, with the result that the hand rest 5 can be pivoted relative to the webs 9, about a further axis 12 which also runs in the transverse direction y of the vehicle. As a result it is possible for a support area of the hand rest 5 which points upward and is not denoted in more detail always to point upward independently of the position of the hand rest 5, with the result that the driver of the motor vehicle 1 can always position his hand comfortably on the hand rest 5.

As is apparent, the touch-sensitive display apparatus 3 is positioned obliquely. Both display regions 7, 8 are therefore oriented obliquely with respect to a plane extending from the longitudinal direction x of the vehicle and transverse direction y of the vehicle. Furthermore, the first display region 7 is arranged further upward in the vertical direction z of the vehicle than the second display region 8.

Figure 3:
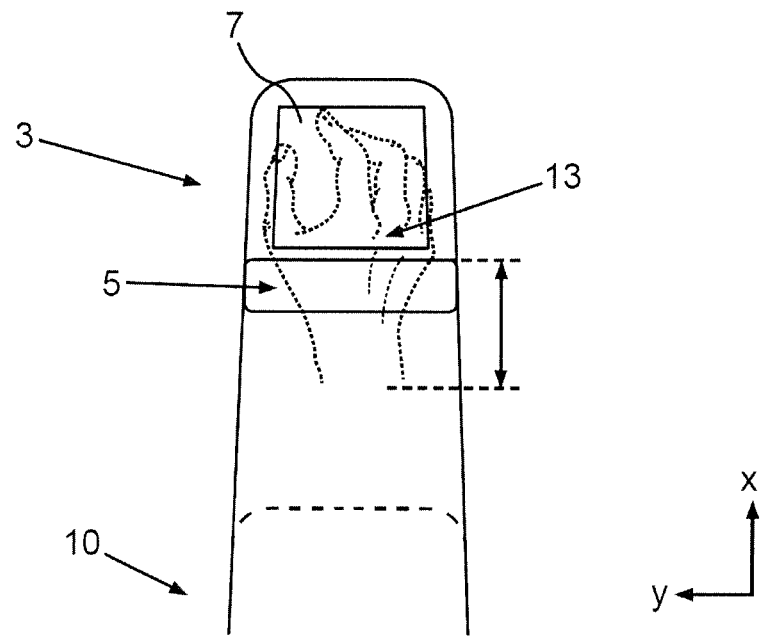
FIG. 3 is a schematic plan view of the adjustable hand rest and touch-sensitive display apparatus, wherein the adjustable hand rest is arranged in the same position as in FIG. 2.

In FIG. 3, the touch-sensitive display apparatus 3 and the hand rest 5 are shown in a schematic plan view, wherein the hand rest 5 is again arranged in the first position as in FIG. 2. A hand 13 of the driver of the motor vehicle 1 which is positioned on the hand rest 5 is additionally indicated schematically. As is apparent, the driver can comfortably operate the first display region 7 with his hand 13 if the hand rest 5 is arranged in the first position.

Figure 4:
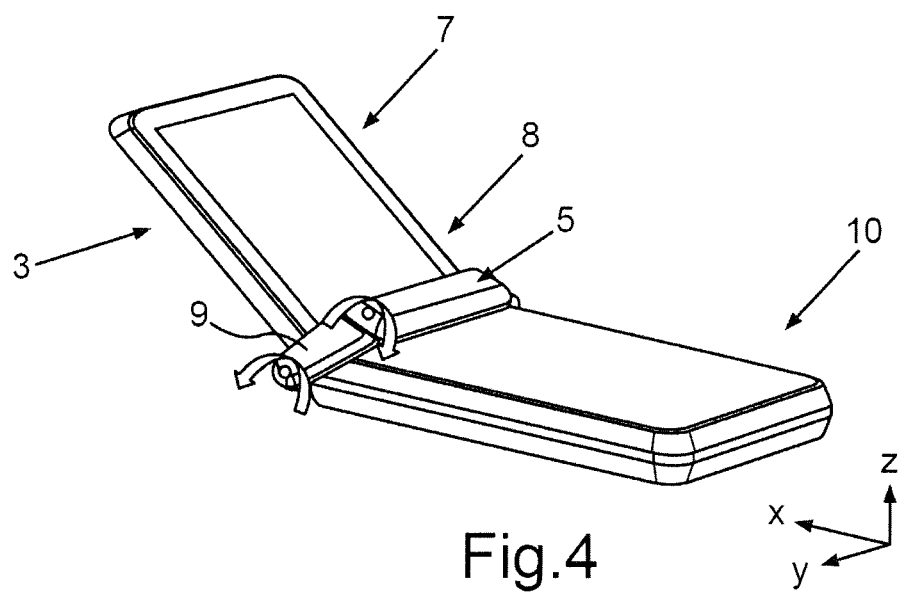
FIG. 4 is a further perspective view in which the adjustable hand rest and the touch-sensitive display apparatus are illustrated, wherein the adjustable hand rest is arranged in another position than in FIGS. 2 and 3.

In FIG. 4, the touch-sensitive display apparatus 3 and the hand rest 5 are shown in a further perspective view, wherein the hand rest 5 is now arranged in a second position. As soon as the hand rest 5 has been adjusted into this second position, the control apparatus 4 activates the driver assistance system 6, as a result of which the autopilot of the motor vehicle 1 is activated. In addition, the control apparatus 4 also switches on the second display region 8 of the display apparatus 3 in addition to the first display region 7. The display and operator control region of the touch-sensitive display apparatus 3 is therefore extended as soon as the hand rest 5 has been adjusted into the second position shown here. When the autopilot is activated, the driver of the motor vehicle 1 therefore has, through the switching on of the second display region 8, a larger display and operator control region available than if the motor vehicle 1 is operated in the manual mode.

Figure 5:
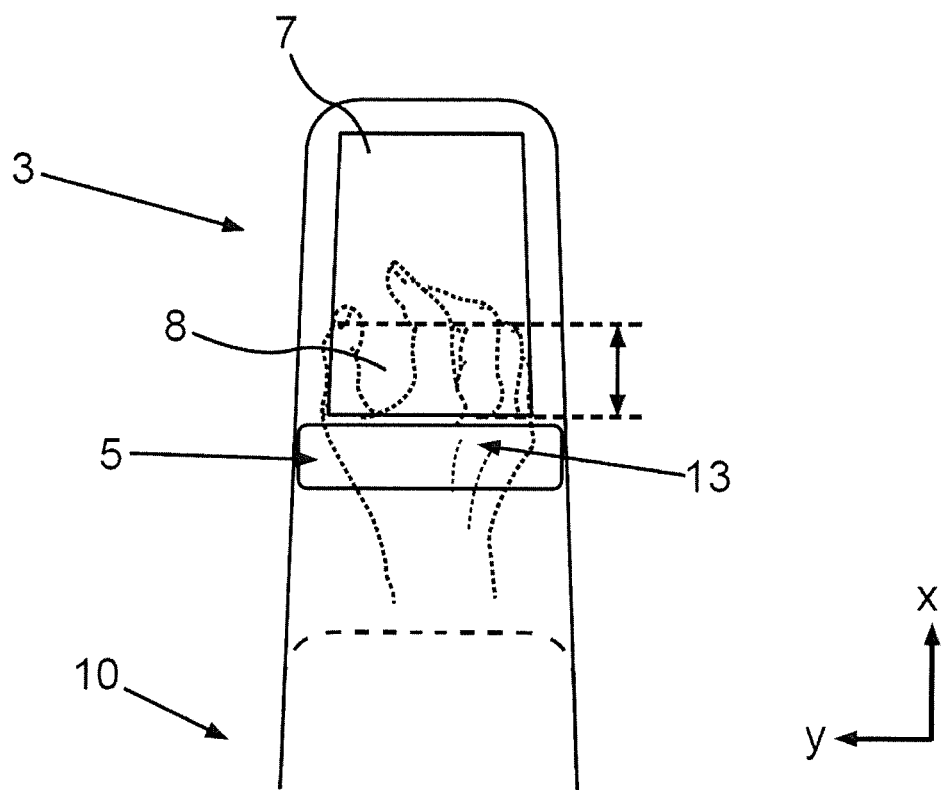
FIG. 5 is a further schematic plan view of the adjustable hand rest and touch-sensitive display apparatus, wherein the adjustable hand rest is arranged in the same position as in FIG. 4.

In FIG. 5, the adjustable hand rest 5 and the touch-sensitive display apparatus 3 are shown in a further schematic plan view, wherein the hand rest 5 is arranged in the second position as shown in FIG. 4. As is apparent, in the second position the hand rest 5 no longer projects beyond the second display region 8 when viewed from above. As a result of the pivoting back of the hand rest 5 into the second position, the driver can now also comfortably operate the additionally activated second display region 8 with his hand 13.

On an underside of the hand rest 5, a release key (not illustrated in the drawings) can be provided. This release key must be activated for the hand rest 5 to be able to be adjusted between the first and second positions. This can ensure that the driver does not inadvertently displace the hand rest 5 and change from a manual driving mode of the motor vehicle 1 into the automatic driving mode, and vice versa.

As a result of the fact that the respective driving mode of the motor vehicle 1, that is to say the manual driving mode or the autopilot mode, depends on the position of the hand rest 5, the mode awareness for the driver is increased for the respective operating mode of the motor vehicle 1. As a result of the switching on and switching off of the second display region 8 as a function of the position of the hand rest 5 and therefore as a function of the driving mode of the motor vehicle 1 it is additionally possible for the operator control and display region of the touch-sensitive display apparatus 3 to be displaced toward the driver in a particularly easy way.

A description has been provided with particular reference to example embodiments, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. An operator control device for a motor vehicle, comprising:
   a touch-sensitive display apparatus;
   a hand rest, provided in a region of the touch-sensitive display apparatus, adjustable between a first position and a second position; and
   a controller configured:
   to activate a first display region of the touch-sensitive display apparatus and a manual driving mode of the motor vehicle, when the hand rest is in the first position, and
   to activate a second display region of the touch-sensitive display apparatus and an autopilot function of the motor vehicle, when the hand rest is in the second position.

2. The operator control device as claimed in claim 1, wherein
   the hand rest is to be disposed further forward in a longitudinal direction of the motor vehicle in the first position than in the second position, when the hand rest is mounted in the motor vehicle, and
   the first display region is to be disposed further forward in the longitudinal direction of the vehicle than the second display region, when the touch-sensitive display apparatus is mounted in the motor vehicle.

3. The operator control device as claimed in claim 1, wherein the controller is configured to extend the first display region to the second display region when the hand rest is in the second position.

4. The operator control device as claimed in claim 1, wherein the controller is configured to deactivate the first display region when the hand rest is in the second position.

5. The operator control device as claimed in claim 1, further comprising:
   a first web which extends from a first side of the hand rest to connect the hand rest to an interior vehicle component, when the hand rest is mounted in the motor vehicle, and
   a second web which extends from a second side of the hand rest to connect the hand rest to the interior vehicle component, when the hand rest is mounted in the motor vehicle.

6. The operator control device as claimed in claim 5, wherein the interior vehicle component is a central console of the motor vehicle.

7. The operator control device as claimed in claim 5, wherein
the hand rest is elongated in a transverse direction of the motor vehicle, when the hand rest is mounted in the motor vehicle
a lower end of the first web and a lower end of the second web are each pivotable about a first transverse axis of the motor vehicle, when the hand rest is mounted in the motor vehicle,
an upper end of the first web is connected to the first side of the hand rest and an upper end of the second web is connected to the second side of the hand rest, and
the hand rest is pivotable about a second transverse axis spaced apart from the first transverse axis, when the hand rest is mounted in the motor vehicle.

8. The operator control device as claimed in claim 1, wherein the hand rest is adjustable from the first position into the second position and/or from the second position into the first position by activation of a release key provided on the hand rest.

9. The operator control device as claimed in claim 1, wherein the touch-sensitive display apparatus is to be disposed obliquely with respect to a plane extending in a longitudinal direction of the motor vehicle and a transverse direction of the motor vehicle, when the touch-sensitive display apparatus is mounted in the motor vehicle.

10. A motor vehicle, comprising:
a driver assistance system configured to provide an autopilot function of the motor vehicle; and
an operator control device, including:
a touch-sensitive display apparatus,
a hand rest, provided in a region of the touch-sensitive display apparatus, adjustable between a first position and a second position, and
a controller configured:
to activate a first display region of the touch-sensitive display apparatus and a manual driving mode of the motor vehicle, when the hand rest is in the first position, and
to activate a second display region of the touch-sensitive display apparatus and the autopilot function of the motor vehicle, when the hand rest is in the second position.

11. The motor vehicle as claimed in claim 10, wherein
the hand rest is disposed further forward in a longitudinal direction of the motor vehicle in the first position than in the second position, and
the first display region is disposed further forward in the longitudinal direction of the vehicle than the second display region.

12. The motor vehicle as claimed in claim 10, wherein the controller is configured to activate each of the first display region and the second display region, when the hand rest is in the second position such that a total display region of the touch-sensitive display region is greater in size than when the hand rest is in the first position.

13. The motor vehicle as claimed in claim 10, wherein the controller is configured to deactivate the second display region when the hand rest is adjusted from the second position into the first position, and to keep the first display region activated when the hand rest is adjusted from the first position into the second position.

14. The motor vehicle as claimed in claim 10, wherein the operator control device further includes:
a first web which extends from a first side of the hand rest to connect the hand rest to an interior vehicle component, and
a second web which extends from a second side of the hand rest to connect the hand rest to the interior vehicle component.

15. The motor vehicle as claimed in claim 14, wherein
the hand rest is elongated in a transverse direction of the motor vehicle, when the hand rest is mounted in the motor vehicle,
a lower end of the first web and a lower end of the second web are each mounted to the interior vehicle component so as to be pivotable about a first transverse axis of the motor vehicle,
an upper end of the first web is connected to the first side of the hand rest and an upper end of the second web is connected to the second side of the hand rest, and
the hand rest is pivotable about a second transverse axis spaced apart from the first transverse axis.

16. The motor vehicle as claimed in claim 10, wherein the operator control device is disposed within the motor vehicle at a position operable by a driver of the motor vehicle.

17. The operator control device as claimed in claim 10, wherein
the touch-sensitive display apparatus is disposed obliquely with respect to a plane extending in a longitudinal direction of the motor vehicle and a transverse direction of the motor vehicle, and
the first display region provided further upward in a vertical direction of the motor vehicle than the second display region.

18. A method for operating a motor vehicle, comprising:
providing a hand rest in a region of a touch-sensitive display apparatus of the motor vehicle;
activating, by a controller, a first display region of the touch-sensitive display apparatus and a manual driving mode of the motor vehicle when the hand rest is in a first position; and
activating, by the controller, a second display region of the touch-sensitive display apparatus and an autopilot function of the motor vehicle when the hand rest is in a second position.

19. The method of claim 18, further comprising:
deactivating, by the controller, the first display region when the hand rest is in the second position; and
deactivating, by the controller, the second display region when the hand rest is in the first position.

20. The method of claim 18, further comprising:
activating, by the controller, both the first display region and the second display region, when the hand rest is in the second position such that a total display region of the touch-sensitive display region is greater in size than when the hand rest is in the first position.

* * * * *

UNITED STATES PATENT AND TRADEMARK OFFICE
CERTIFICATE OF CORRECTION

PATENT NO. : 10,482,841 B2
APPLICATION NO. : 16/319068
DATED : November 19, 2019
INVENTOR(S) : Martina Heinze It is certified that error appears in the above-identified patent and that said Letters Patent is hereby corrected as shown below:

In the Claims

Column 10, Line 28:
In Claim 17, delete "operator control device" and insert -- motor vehicle --, therefor.

Signed and Sealed this
Eighteenth Day of February, 2020

Andrei Iancu
*Director of the United States Patent and Trademark Office*